United States Patent [19]

Delias et al.

[11] Patent Number: 5,529,104
[45] Date of Patent: Jun. 25, 1996

[54] TIRE WITH REINFORCED SIDEWALLS

[75] Inventors: Alain Delias, Perignat-les-Sarlieves, France; François Doremieux, Stanford, Calif.

[73] Assignee: Compagnie Generale des Etablissements Michelin - Michelin & Cie, Clermont-Ferrand Cedex, France

[21] Appl. No.: 419,418

[22] Filed: Apr. 10, 1995

[30] Foreign Application Priority Data

Apr. 11, 1994 [FR] France ................................ 94 04353

[51] Int. Cl.$^6$ ................................ B60C 3/06; B60C 9/00; B60C 15/06
[52] U.S. Cl. ........................ 152/456; 152/542; 152/543; 152/555
[58] Field of Search ............................ 152/555, 542–543, 152/455–456, 539

[56] References Cited

U.S. PATENT DOCUMENTS

| | | |
|---|---|---|
| 3,050,098 | 8/1962 | Grote . |
| 3,844,327 | 10/1974 | Marzocchi . |
| 4,295,511 | 10/1981 | Mezzanotte et al. . |
| 5,078,192 | 1/1992 | Lindsay . |

FOREIGN PATENT DOCUMENTS

| | | |
|---|---|---|
| 0465187 | 1/1992 | European Pat. Off. . |
| 1339206 | 8/1963 | France . |

Primary Examiner—Adrienne C. Johnstone
Attorney, Agent, or Firm—Brumbaugh, Graves, Donohue & Raymond

[57] ABSTRACT

The present invention relates to the field of tires having reinforced sidewalls. In order to improve the high-speed performance of a tire and reduce the extent of vibration of the sidewalls (1) and effectively transmit a torque from the wheel to the ground via the tire, the rigidity of the sidewalls of the tire is adjusted by the provision of reinforcements (6) in the form of assembly sections oriented in circumferential direction. Said assembly sections are of short length as compared with the development of the tire measured at the point S of the tire which is located furthest radially to the outside.

8 Claims, 2 Drawing Sheets

TIRE WITH REINFORCED SIDEWALLS

BACKGROUND OF THE INVENTION

The present invention relates to the field of tires and, in particular, tires having reinforced sidewalls.

In general, a tire consists of several parts, each of which plays a precise role in the operation of the tire, namely a crown which is located radially towards the outside, that is to say radially towards the largest radii of the tire, and is generally reinforced by a belt reinforcement, it having a tread, said crown being extended radially towards the inside, that is to say radially towards the smallest radii, by two sidewalls which are themselves extended radially towards the inside by beads.

The role of the sidewalls is to transmit forces between the crown and the beads of the tire. For this, said sidewalls have at least one carcass reinforcement which can extend into the crown of the tire and which is furthermore securely anchored in the beads by suitable means.

The carcass reinforcement is formed of reinforcements connected to each other by an elastomeric material and generally, but not exclusively, made in the form of a ply.

The expression "securely anchored in the beads" means that the beads are designed in such as manner as to take up all of the forces which are developed in the carcass reinforcement under the effect of the inflation pressure and the effect of the rolling of the tire.

In the present document, the expression "assembly" designates any reinforcement formed by the combination of several elements of a rigidity far greater than the average rigidity of the elastomer mixes used in the tire industry, such as for instance cords, filaments or strands, whatever the material thereof.

In order to improve the high-speed performance of a tire and reduce as far as possible the amplitude of the vibrations of the sidewalls, and also in order to be able to transmit a large torque from the wheel to the ground by the tire, it is desirable to increase the circumferential rigidity of the sidewalls and, at the same time, to adjust this rigidity in the best way possible as a function of the radial position in question in said sidewall.

There are several patents which describe the placing of assemblies in circumferential direction in the sidewalls of a tire. Aside from the fact that these patents are all directed at solving manufacturing problems when using continuous circumferential reinforcements, no mention is made therein of the importance of effecting a suitable variation of the circumferential rigidity as a function of the radial position in the sidewalls.

In particular, French Patent 1 304 907 describes a process of manufacturing a tire each of the sidewalls of which is reinforced by a reinforcement arranged along the circumferential direction. Said process consists, first of all, of producing on a suitable form a ring formed by the spiral winding of a single reinforcement which is held in place by elastomeric material, and then placing said ring on a shaped tire blank in order to form one of the sidewalls of said tire.

Such a process, while it makes it possible in fact to manufacture tires having circumferential reinforcements, as assemblies for instance, is very expensive to carry out and furthermore does not make it possible easily to effect a suitable adjustment of the circumferential rigidity as a function of the radial position in the sidewall.

Another manner of procedure is described in French Patent 2 170 848. That patent describes the possibility, in the case of a manufacturing process comprising a shaping step, of manufacturing tires the sidewalls of which are reinforced in circumferential direction by continuous assemblies known as "breaking core assemblies"; these assemblies comprise a linear core cord around which the reinforcement assembly proper is helically wound. This assembly is placed by circumferential winding on the carcass reinforcement, which itself is arranged on a building drum before shaping. During the shaping of the carcass, said breaking-core assembly has to adopt a development which is all the greater the greater the shaping ratio. This is possible due to the structure of the reinforcement assembly; in fact, after an initial phase during which only the core of said assembly opposes the deformation, the core breaks as soon as the rupture force of said core is reached, then leaving the assembly free to lengthen practically without effort.

It may be recalled that the shaping ratio of a product entering into the composition of a tire is the ratio between the radius of the cylinder for the laying of this product upon manufacture and the value of the radius of said product after the shaping.

However, in this example, only the reinforcement elements arranged in the sidewalls towards the largest radii will have resumed a quasi-elongated shape, that is to say with a quasi-infinite helicoidal pitch. Therefore, the effect of reinforcement to traction is maximum only on the assemblies located furthest radially to the outside. It is impossible here also by this means to adjust the circumferential rigidity of the sidewall reinforcements as a function of the radial position in said sidewall.

SUMMARY OF THE INVENTION

The object of the present invention is to provide a tire having two sidewalls which are extended radially towards the outside by a crown comprising a tread and radially towards the inside by the beads, the sidewalls having at least one carcass reinforcement and at least one of said sidewalls having circumferentially oriented reinforcements which are coupled mechanically to said carcass reinforcement, characterized by the fact that said sidewall reinforcements are formed of groups comprising one or more sections of assemblies, said sections having a length less than 1/10th of the circumference, measured at the point of the crown furthest radially to the outside, each group being coupled, in the vicinity of each of its two ends, to at least one other neighboring group.

In order to define the concept of groups neighboring a given group, it is necessary to define an equivalent diameter of said group as being the diameter of the cross section of a torus of circular cross section circumscribed on said group and the axis of symmetry of which is identical to the axis of rotation of the tire. A group is considered a neighbor of a given group when there is an overlap between said groups and when the distance separating the closest generatrices of said groups is at most equal to the equivalent diameter of the given group. There is overlap between two groups if there is at least one radial section plane common to the two groups and if there is no other group interspersed between them.

The expression "group of assembly sections" designates a group formed by the juxtaposition of several sections of substantially the same length, said sections being arranged parallel to each other and juxtaposed over practically their entire length. The length of a group is substantially equal to the length of the sections forming it. Preferably, an assembly section will have a length less than the average circumference of the torus circumscribed on the group to which said section belongs. The average circumference of said torus is equal to the perimeter of the circle passing through all the centers of the cross sections of said torus.

In a group, the assembly sections may be formed of assemblies which are identical or different and they may be located in the same plane or else in different planes; said sections are held together by an elastomeric material. At the limit, one group may contain only a single section.

In one and the same tire it is, of course, possible to use groups of different lengths.

It is said that two groups are coupled when there is an overlap between them and when there is a mechanical bond between said groups permitting transmission of a traction force from one group to the other by shearing of said bond.

In accordance with another aspect of the invention, it is desirable that each group of assembly sections which is intended to reinforce one of the sidewalls of a tire be coupled, at each of its two ends, to neighboring groups over a total coupling length at least equal to 20% of the length of said group.

In order for tensile forces to be developed in the assembly sections it is preferable that the length of each assembly section be greater than 1/50th of the average circumference of the torus circumscribed on the group to which said section belongs.

The transmission of a tensile force from one group to other neighboring groups is possible if the sum of the coupling lengths between said group and the neighboring groups is at least equal to 20% of the length of said group.

For each radial position in the sidewall, an equivalent rigidity in extension of a circumferential strip comprising the groups of reinforcements arranged circumferentially to said position and the neighboring groups can be defined, for instance, by effecting, by a structural calculation, a uniform, predetermined circumferential extension of said strip. The equivalent rigidity is then equal to the ratio between the calculated force and the extension imposed.

The invention resides in the use of means which make it possible circumferentially to reinforce the sidewalls of a tire while optimally adjusting the equivalent rigidity of circumferential extension of said sidewalls. For example, an increase in the equivalent rigidity is possible by increasing the length of the groups and/or by increasing the coupling length of each group. In this way, it is possible to delay the appearance of deformations in the sidewalls when the speed of use of the tire increases, without thereby changing the ability of the sidewalls to flex under the action of the loads imposed.

DESCRIPTION OF DRAWINGS

The invention will be fully understood by reference to the accompanying drawings, in which two embodiments are shown.

DESCRIPTION OF PREFERRED EMBODIMENTS

Figure 1:
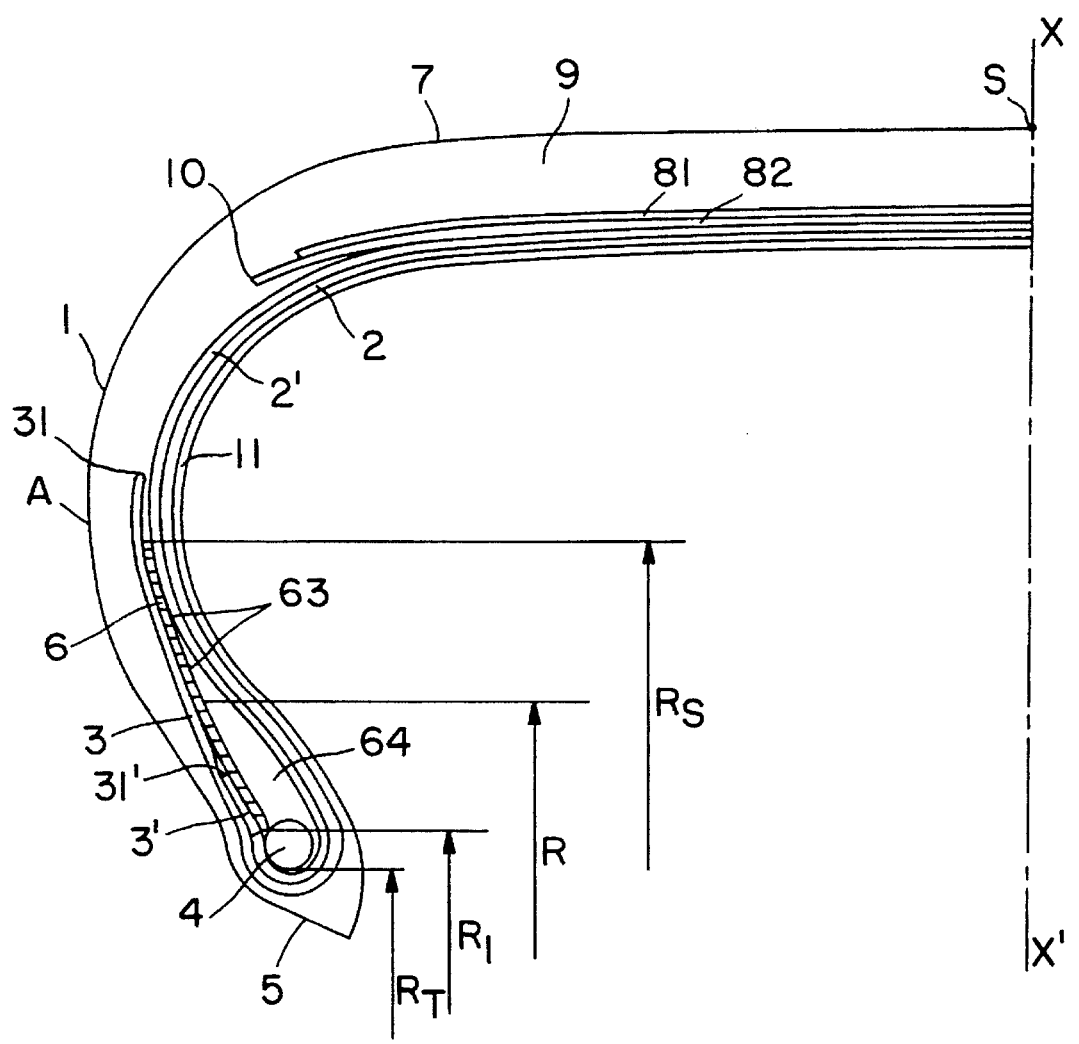
FIG. 1 is a radial half section through a passenger car tire according to the invention, of size 235/45 ZR 17.

Only a radial half-section of a passenger car vehicle of size 235/45 ZR 17 is shown diagrammatically in FIG. 1, in view of the symmetry of said section with respect to the axis XX'.

This tire is formed of a crown 7 having, radially to the outside, a tread 9, two sidewalls 1, and two beads 5 the function of which is to assure the mechanical connection with the wheel used.

This tire comprises two carcass reinforcements 2 and 2', each of said reinforcements being reinforced by rayon assemblies of 244*2 tex linear density, oriented radially; in the crown, the reinforcement 2' is radially to the outside of the reinforcement 2. Said carcass reinforcements 2 and 2' are turned up around the bead wire 4 so as to form two turn-up portions 3 and 3' the ends 31 and 31' of which are located, respectively, radially beyond and radially inside of the point A of the sidewall which is located furthest axially to the outside. The crown 7 comprises a crown belt formed by the stack of two plies 81, 82, each of these plies being reinforced by metal assemblies forming a small angle with respect to the circumferential direction.

An air-tight rubber compound 11 on which the inflation pressure of the tire acts directly has the role of effecting the sealing of the tire.

The development measured, on the tire mounted on its rim and inflated to its rated pressure, at the point S on the tread 9 furthest radially to the outside is equal to 2021 mm.

Figure 2:
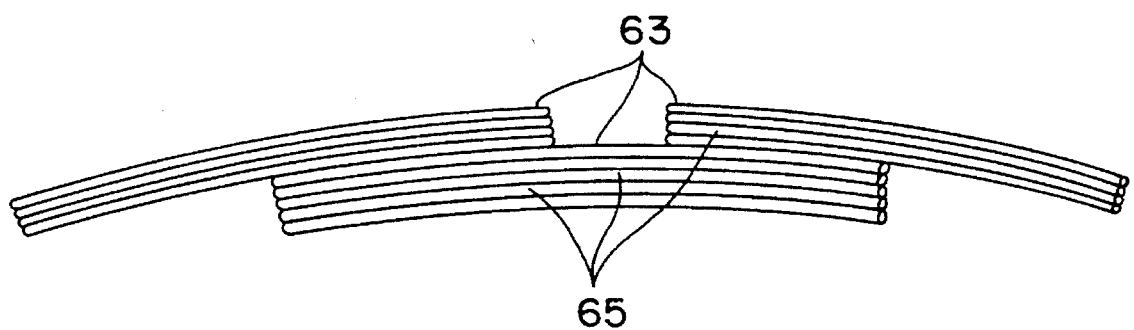
FIG. 2 is a face view, perpendicular to FIG. 1, showing groups of assembly sections of the reinforcement of the sidewall.

The sidewall 1 of the tire, contained between the end 10 of the axially widest ply 82 and the bead 5, has reinforcements 6 arranged in the circumferential direction, that is to say forming an angle of 90° with the direction of the assemblies of the carcass reinforcements 2 and 2'; in the present case, as shown in FIG. 2, said reinforcements are formed of groups 63 of at least four assembly sections 65 of a length of 80 mm, arranged concentrically to each other. The assemblies used are rayon assemblies of 244*2 tex linear density.

In the example described, it has been found advantageous for the equivalent rigidity of circumferential extension of the sidewalls to follow a law of variation of the form:

$$KR^\alpha = C_0,$$

in which K is the equivalent rigidity of circumferential extension at the level of the reinforcements located at a radius R measured with respect to the axis of rotation of the tire, $\alpha$ is a real number, and $C_0$ is a constant selected as a function of the size of the tire. More precisely, the radius R corresponds to the average radius of the torus circumscribed on the assembly sections in question.

In the examples described, after having placed the two carcass reinforcements on a building drum, plies of elastomer mix are wound on the regions of said reinforcements corresponding to the sidewalls of the tire and over said plies there is wound a reinforcement ply comprising circumferentially oriented assemblies, in which said assemblies have been cut to form groups of assembly sections of an average length of 80 mm. Upon proceeding then with the shaping of said carcass reinforcement reinforced in the regions of the sidewalls, the groups will be able to move with respect to each other by shearing of the calendering mix present between said groups and it is thus possible to obtain said law of variation of the equivalent rigidity of circumferential extension with α equal to 1.

In this case, the groups located furthest radially to the outside (that is to say, those furthest from the axis of rotation of the tire) will move more with respect to their neighbors, without, however, presenting an overlap length between two neighboring groups of less than 30 mm on the tire manufactured.

In the tire described, the circumferential reinforcements 6 are positioned between a circle of radius Rs=247 mm and a circle of radius Ri=280 mm in the bead 5. The radius Rs corresponds substantially to the radial distance of the point A of the sidewall furthest axially to the outside, while the radius Ri is between the radius of the end 31' of the turn-up 3' of the carcass reinforcement 2' and the radius $R_t$ of the bead wire 4 of the bead 5, measured at the point of said wire furthest radially to the inside. The radii Rs, Ri are measured with respect to the axis of rotation of the tire; the same is true of the radius R of a circle centered on the axis of rotation of the tire and passing through any point of the sidewall.

The mechanical coupling between the reinforcements 6 and the carcass reinforcements 2 and 2' is effected by a profiled section of elastomer mix 64 in the case of the reinforcements closest to the bead wire 4 and by the calendering mixes for the reinforcements closest to the point A.

In certain cases, including the one described here, the use of this type of reinforcement may offer the advantage of not having to use in the bead one or more additional reinforcement plies which are customarily formed of assemblies inclined with respect to the circumferential direction and having the role of reducing the circumferential movements of the bead of the tire along the flange of the mounting rim of said tire.

The applicant has furthermore carried out a comparative test between tires made in accordance with the invention and tires which contain, in their sidewalls, metal assemblies forming an angle other than zero with respect to the circumferential direction. The test consists in causing a tire to roll on a flywheel, the inflated tire being subjected to a fixed load, and gradually increasing the speed of rotation of said flywheel until the tire bursts. It was found that a tire produced in accordance with the invention permitted, with identical performance in the test, a lightening of the tire by about 5% as compared with the ordinary tire.

In addition to the advantage of the invention with respect to high-speed performance, it has been found that a tire in accordance with the invention also showed substantial improvement in its performance of endurance upon rolling under conditions of low or even no inflation pressure.

Figure 3:
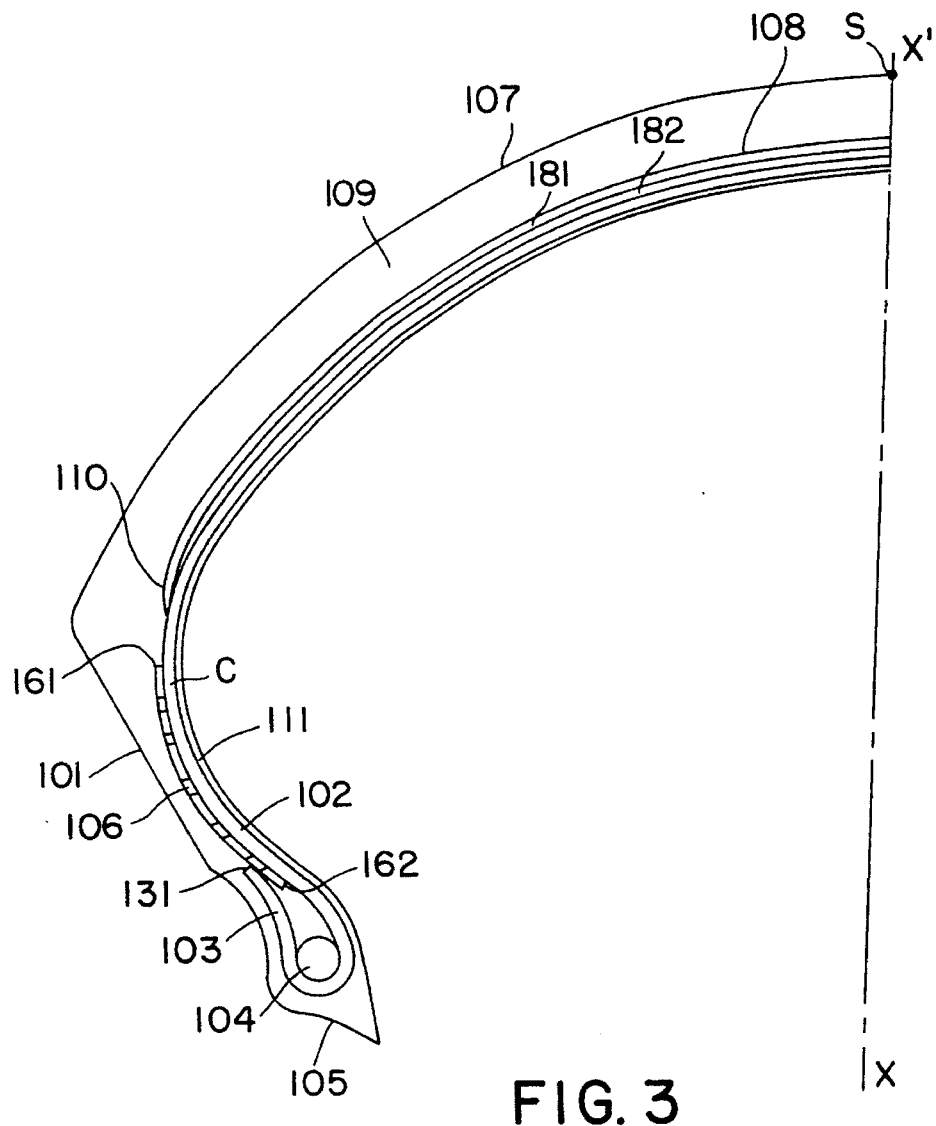
FIG. 3 is a radial half section of a motorcycle tire according to the invention, of size 18/67 R 17.

Another application of the invention is illustrated by the motorcycle tire of size 18/67 R 17 a meridian half section of which is shown in FIG. 3. The complete section is obtained by symmetry of the half section shown with respect to the axis XX'.

In the case of a tire for a two-wheel vehicle, it has been found particularly advantageous, from the point of view of performance at high speed, to reinforce the sidewalls of said tire by groups of assembly sections, said sections being of a length less than 1/15th of the circumference, measured at the point of the crown furthest radially to the outside and in the manner that each group is coupled, in the neighborhood of each of its two ends, over at least 35% of its length to neighboring groups.

The tire in accordance with the invention is formed by a crown 107, two sidewalls 101, and two beads 105. The crown 107 has a belt 108 reinforced by two plies 181, 182, radially above which on the outside there is a tread 109. The radially outside end of the sidewall corresponds to the end 110 of the ply 181 furthest radially to the outside and widest axially. A sealing rubber compound 111 is arranged on the inside of the tire. The development of this tire, measured at the point S of the tread furthest radially to the outside, is 2010 mm.

A carcass reinforcement 102 formed of radially arranged nylon assemblies is anchored in the bead 105 by turning around the bead wire 104 and thus forms a turn-up 103 the end 131 of which is located radially to the inside with reference to the point C of the profile of the carcass reinforcement 102 furthest axially to the outside.

A reinforcement ply 106, formed of groups of four assembly sections of rayon of 368 rex linear density which are oriented circumferentially is coupled to the carcass reinforcement so as to be located to a large part axially to the outside of said reinforcement. Seen in section in FIG. 3, this ply 106 extends between the points 162 and 161 which are located at a distance of about 185 mm and of 221 mm respectively from the axis of rotation of the tire. The end 162 of the reinforcement ply 106 is located on a circle of a radius less than the radius of the circle passing through the end 131 of the turn-up 103 of the carcass reinforcement 102. The end 161 is located on a circle of a radius less than the radius of the circle passing through the end 110 of the axially widest belt ply. The groups have a length of about 75 mm and are arranged, in the tire, in such a manner as to have, at each of their ends, coupling lengths at least equal to 30 mm. The mechanical coupling between the carcass reinforcement 102 and the reinforcement ply 106 is effected by the calendering mixes of said reinforcement 102 and said ply 106 respectively.

Figure 4:
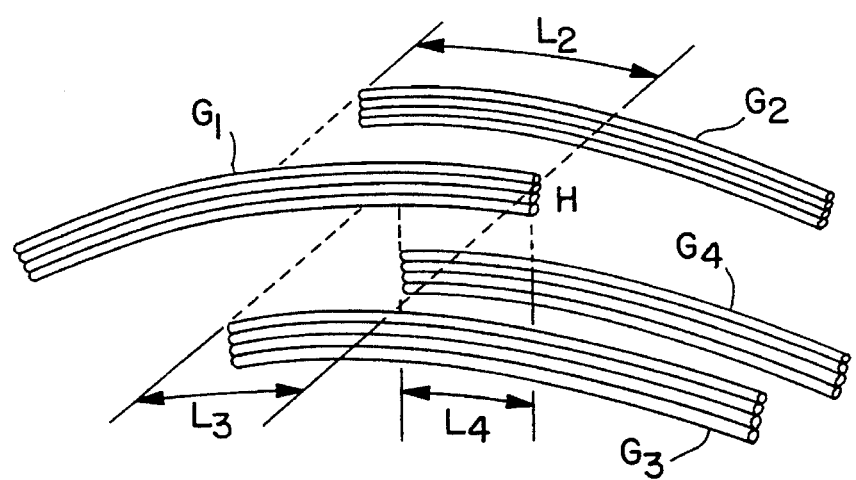
FIG. 4 is a view of the coupling between several groups of assembly sections, used as sidewall reinforcement.

FIG. 4 shows diagrammatically an example of coupling which may be present between a group of assembly sections $G_1$ and its neighboring groups $G_2$, $G_3$, $G_4$. In the configuration shown, which has been selected only by way of example, the groups $G_1$, $G_2$, $G_3$, are located on the same cylindrical ring, that is to say, at the same radial distance measured with respect to the axis of rotation of the tire, while the group $G_4$ is not located on said ring but in a plane perpendicular to the axis of rotation which also contains the group $G_1$. The group $G_1$ is coupled at its end H to the three groups $G_2$, $G_3$, $G_4$; this means that there is an overlap between each of the three groups $G_2$, $G_3$, $G_4$ and the group $G_1$ over lengths $L_2$, $L_3$, $L_4$ respectively, and that the mechanical connection between these groups is effected by means of elastomer mix. Furthermore, in order to assure an effective taking-up of the tensile forces in the group $G_1$ by the groups $G_2$, $G_3$, $G_4$, it is desirable that the sum of the lengths $L_2$, $L_3$, $L_4$ be at least equal to 20% of the length of the group $G_1$. In this way, it is possible to avoid the appearance of excessive local shear stresses, which therefore reduce the life of the tire.

The examples described in the present document are in no case to be considered as limiting the application of the invention to the manufacture of tires on manufacturing means comprising a shaping step. The tire in accordance with the invention can be made entirely by operations of winding groups of assembly sections on a support which imposes the inner shape of the tire, and therefore without shaping.

We claim:

1. A tire having two sidewalls extended radially towards the outside by a crown having a tread and radially towards the inside by beads, each sidewall having at least one carcass reinforcement and at least one of said sidewalls having circumferentially oriented reinforcements which are coupled mechanically to said carcass reinforcement, characterized by the fact that said sidewall reinforcements are formed of groups comprising one or more sections of assembly, said sections having a length less than 1/10th of the circumference, measured at the point of the crown furthest radially to the outside, each group being coupled, in the neighborhood of each of its two ends, to at least one other group of sections.

2. A tire according to claim 1, characterized by the fact that each group of sections of the sidewall reinforcement is coupled, at each of its two ends, to neighboring groups over a total length of coupling at least equal to 20% of the length of said group, said total coupling length being determined by the sum of the individual coupling lengths of said group to each of the neighboring groups.

3. A tire according to claim 1, characterized by the fact that the tire is for a two-wheel vehicle and by the fact that the sidewall reinforcements are formed of groups of assembly sections, said sections being of a length less than 1/15th of the circumference measured at the point of the crown furthest radially to the outside, and by the fact that each group is coupled, in the neighborhood of each of its two ends, over at least 35% of its length to the neighboring groups.

4. A tire according to claim 1, characterized by the fact that the carcass reinforcement is arranged radially.

5. A tire according to claim 1, characterized by the fact that the average rigidity of circumferential extension of the sidewalls follows a law of variation of the form:

$$KR^\alpha = C_0,$$

in which $K$ is the equivalent rigidity of circumferential extension at the level of the reinforcements located at a radius $R$ measured with respect to the axis of rotation of the tire, $\alpha$ is a real number, and $C_0$ is a constant selected as a function of the size of the tire.

6. A tire according to claim 1, characterized by the fact that the length of each section is less than the average circumference of the torus circumscribed on the group to which said section belongs.

7. A tire according to claim 1, characterized by the fact that the length of each section is greater than 1/50th of the average circumference to the torus circumscribed on the group to which said section belongs.

8. A tire according to claim 1, characterized by the fact that the sidewall reinforcements are arranged starting from a point radially towards the inside of the shoulder of the tire and up to bead of said tire.

* * * * *

UNITED STATES PATENT AND TRADEMARK OFFICE
CERTIFICATE OF CORRECTION

PATENT NO. : 5,529,104
DATED : June 25, 1996
INVENTOR(S) : Delias et al.

It is certified that error appears in the above-indentified patent and that said Letters Patent is hereby corrected as shown below:

Col. 6, line 16, "rex" should read --tex--.

Col. 8, line 19, "to the torus" should read --of the torus--;

line 25, "to bead" should read --to the bead--.

Signed and Sealed this

Twenty-sixth Day of November 1996

Attest:

BRUCE LEHMAN

Attesting Officer     Commissioner of Patents and Trademarks